United States Patent

An

[11] Patent Number: 5,127,597
[45] Date of Patent: Jul. 7, 1992

[54] TAPE REEL ASSEMBLY WITH IMPROVED REEL PLATE MOUNTING

[75] Inventor: Jae K. An, Chunan, Rep. of Korea

[73] Assignee: SKC Limited, Kyungki, Rep. of Korea

[21] Appl. No.: 515,605

[22] Filed: Apr. 27, 1990

[30] Foreign Application Priority Data

Sep. 16, 1989 [KR] Rep. of Korea .................. 89-13602

[51] Int. Cl.⁵ .......................................... B65H 75/18
[52] U.S. Cl. ................................. 242/71.8; 242/199
[58] Field of Search ................. 242/71.8, 192, 197, 242/198, 199, 200; 360/132

[56] References Cited

U.S. PATENT DOCUMENTS

| | | | |
|---|---|---|---|
| 3,330,494 | 7/1967 | Rissberger, Jr. | 242/71.8 |
| 3,934,839 | 1/1976 | Serizawa | 242/198 |
| 4,244,535 | 1/1981 | Moodie | 242/71.8 |
| 4,254,919 | 3/1981 | Moodie | 241/71.8 |
| 4,289,282 | 9/1981 | Kohno | 242/71.8 |
| 4,473,198 | 9/1984 | Pertzsche et al. | 242/71.8 X |
| 4,523,727 | 6/1985 | Morioka | 242/71.8 X |
| 4,564,156 | 1/1986 | Cybulski | 242/71.8 X |
| 4,606,511 | 8/1986 | Machida | 242/71.8 |
| 4,664,328 | 5/1987 | Yamada | 242/71.8 |
| 4,715,558 | 12/1987 | Fair et al. | 242/71.8 X |
| 4,768,122 | 8/1988 | Kawada | 242/199 X |
| 4,846,419 | 6/1989 | Tatero et al. | 242/71.8 |
| 4,930,714 | 6/1990 | Hashizume et al. | 242/71.8 |
| 4,932,604 | 6/1990 | Maehara et al. | 242/71.8 X |
| 4,995,565 | 2/1991 | Urayana et al. | 242/71.8 |
| 5,007,596 | 4/1991 | Iwahashi | 242/71.8 |

Primary Examiner—Daniel P. Stodola
Assistant Examiner—John P. Darling
Attorney, Agent, or Firm—Ladas & Parry

[57] ABSTRACT

A lower reel plate structure for a video tape cassette which is characterized in that the lower reel plate is formed such that an extended portion is provided on the tops of a hub wall and a boss, a space formed between the hub wall and the boss is provided with a downward opening, and a step is provided along the whole peripheral edge where the hub wall and the extended portion join together.

3 Claims, 2 Drawing Sheets

TAPE REEL ASSEMBLY WITH IMPROVED REEL PLATE MOUNTING

FIELD OF THE INVENTION

The present invention relates to an improved reel for a video tape cassette, which is installed within the cassette to wind and protect the tape, and particularly to a lower reel plate structure in which product defects liable to occur due to improper injections during the injection molding can be prevented by modifying the structure of the lower reel plate to facilitate flow of the resin, and in which the damage of the wound tape liable to occur due to improper heat bondings during the coupling of the upper reel plate with the lower reel plate can be prevented by also modifying the structure of the lower reel plate.

BACKGROUND OF THE INVENTION

Generally, a video tape cassette stores a supply reel and a take up reel, both of which perform complementary roles in protecting the tape running between the two reels. In such reels, the lower reel plate and the upper reel plate are coupled conventionally in such a manner that, as shown in FIG. 3, a boss 21 is formed at the centre of a lower reel plate 20, a space 24 having an upward opening is formed outwardly to the boss 21, a cylindrical hub wall 22 is formed uprightly from the face of the lower reel plate 20, and an upper reel plate 23 is mounted upon the boss 21 and the hub wall 22 to be fixed thereon.

In such a structure of the lower reel plate, when a melted resin is injected into a molding die, the resin is press-injected into an injecting section 25 which is formed on the ceiling of the boss 21, and then, the resin is spread into the interior of the injection die. In such a structure, there has been the problem that the resin cannot smoothly flow, and that defects in the form of an overlap 30 occur during the coupling of the upper reel plate.

That is, according to the conventional lower reel plate structure, the resin injected into the injecting section 25 is broken down into the left and right directions in its flowing from the ceiling of the boss, and then, the flowing resin passes along the horizontal bottom of the lower reel plate to finally fill up to the top of the hub wall.

In such a structure, the flowing resin experiences considerable resistances until it is filled up to the top of the hub wall, and consequently, the charging efficiency of the resin is lowered. This brings the result that a time delay is imposed on the press-injecting procedure of the injection molder, thereby reducing the productivity and increasing the power consumption. Further, there occur injection defects which in turn cause product defects, and overlap phenomena occur due to the direct perpendicular crossing of the upper reel plate with the outer face of the hub wall during the coupling of the upper reel plate, with the result that the tape wound on the hub is ultimately damaged.

SUMMARY OF THE INVENTION

Therefore, it is the object of the present invention that a lower reel plate structure of a vodeo tape cassette, in which the above described disadvantages of the conventional lower reel plate are overcome, thereby decreasing the product defects.

BRIEF DESCRIPTION OF THE DRAWINGS

The above object and other advantage of the present invention will become more apparent by describing in detail the preferred embodiment of the present invention with reference to the attached drawings in which.

DESCRIPTION OF THE PREFERRED EMBODIMENT

Figure 1:
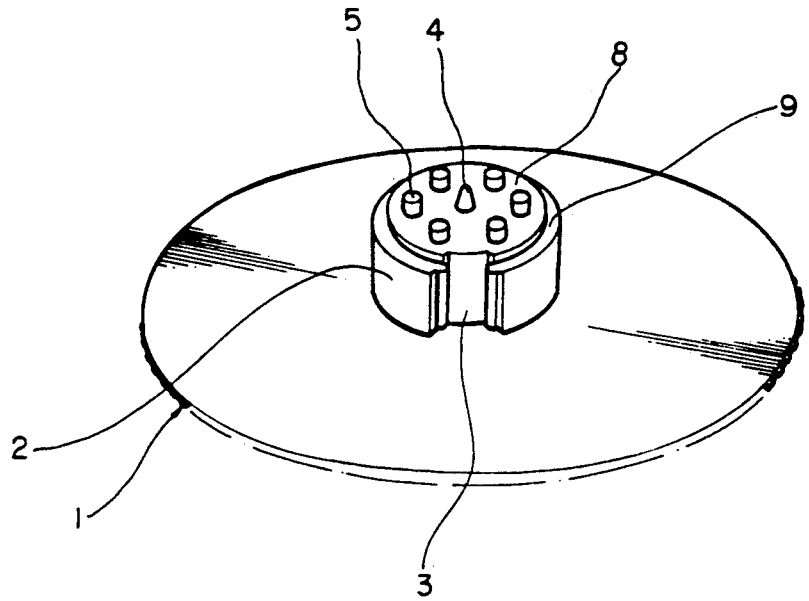
FIG. 1 is a perspective view of the device of the present invention.

The constitution, action and effect of the device of the present invention will be described referring to the drawings.

Figure 2:
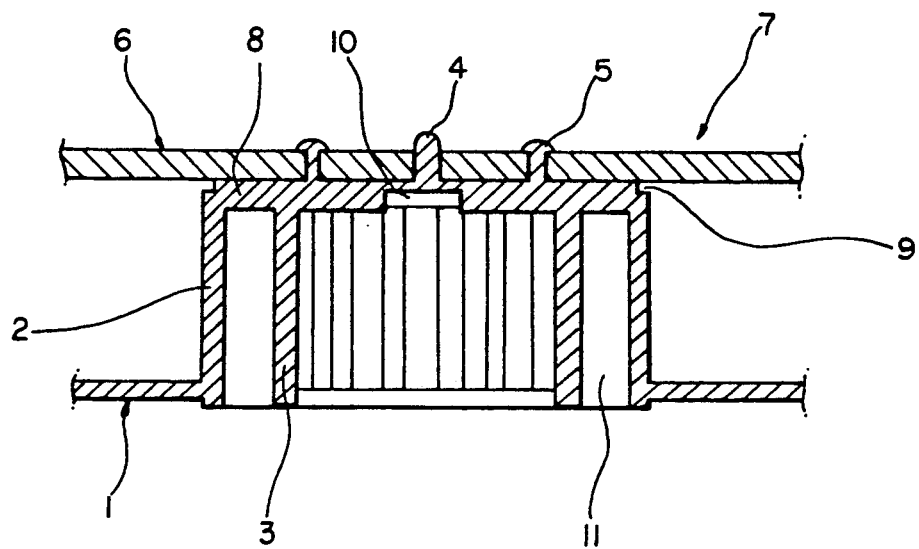
FIG. 2 is a longitudinal sectional view of a part of the device of the present invention showing the coupled state of the reel.
Figure 3:
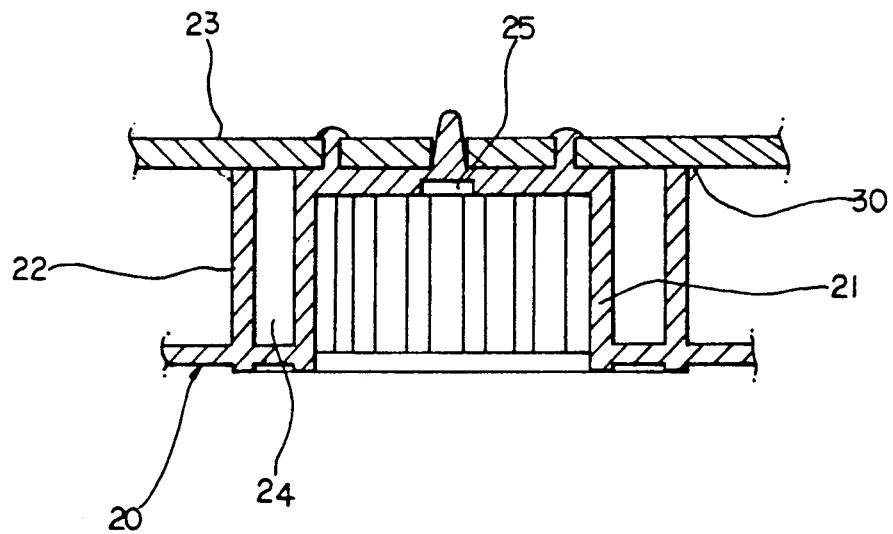
FIG. 3 is a longitudinal sectional view of a part of the conventional device showing the coupled state of the conventional reel.

FIG. 1 is a perspective view of the device of the present invention, and FIG. 2 is a longitudinal sectional view of a part of the present invention showing the coupled state of the reel.

As shown in the drawings, the reel 7 of a video cassette tape according to the present invention comprises: a lower reel plate 1; a hub wall 2 and a boss 3 formed at the centre of the reel plate 1; a centre boss 4 and a melt-fixing projection 5 provided upon the boss 3; and an upper reel plate 6 melt-fixed upon the boss 3 of the lower reel plate 1, and is characterized in that the lower reel plate 1 is formed such that an extended portion 8 is provided upon the tops of the hub wall 2 and the boss 3, a space 11 formed between the hub wall 2 and the boss 3 is provided with and downward opening, and a step 9 is provided along the whole of the peripheral edges where the extended portion 8 and the hub wall 2 join together.

Reference code 10 in the drawing indicates an injecting section for the melted resin.

In the device of the present invention constituted as described above, if a thermoplastic resin heated and melted within a heating cylinder of an injection molder is press-injected into a molding die by means of an injection ram and a flinger, the melted resin is filled from the boss 3, and flows downwardly to form the boss 3 and the hub wall 2 simultaneously. Then the melted resin is spread toward all the four directions and downwardly to form the lower reel plate 1.

According to the structure of the present invention, the resistance to be experienced by the flowing resin during the filling of the resin is reduced to the lowest level, thereby reducing the product defects due to the injection defects, and improving the productivity and the power efficiency. Further, the step 9 formed on the top of the hub wall 2 prevents the formation of an overlapping, thereby preventing the damage to the tape which is wound around the hub wall.

What is claimed is:

1. A reel for a tape comprising:
   a lower reel plate;
   a boss extending upwardly from substantially a center of the lower reel plate;
   a hub extending upwardly from the lower reel plate radially outwardly on the boss, the hub and boss defining an annular space therebetween;
   a top wall formed at upper ends of the boss and hub and interconnecting the boss and hub, the top wall having an extended portion with a diameter less than the diameter of the outer periphery of the top wall such that a step is formed between the outer periphery and the extended portion and being substantially parallel with the lower reel plate wherein the annular space is sealed at its upper end by the top wall and open at its lower end; and an upper reel plate mounted on the top wall, whereby the step defines an annular recess between the hub wall and the upper reel plate.

2. A reel as claimed in claim 1 further comprising a plurality of projections extending upwardly from the top wall, the projections being received in corresponding apertures within the upper reel plate.

3. A reel as claimed in claim 2 further comprising a center boss extending upwardly from the top wall, the center boss being received in a center aperture on the upper reel plate, the center boss and center aperture facilitating proper placement of the upper reel plate on the top wall.

* * * * *